Dec. 6, 1966  R. E. KESTING  3,290,286
PARTIALLY HYDROLYZED CELLULOSIC REVERSE OSMOSIS
MEMBRANES AND METHODS OF PREPARING THE SAME
Filed Oct. 18, 1965
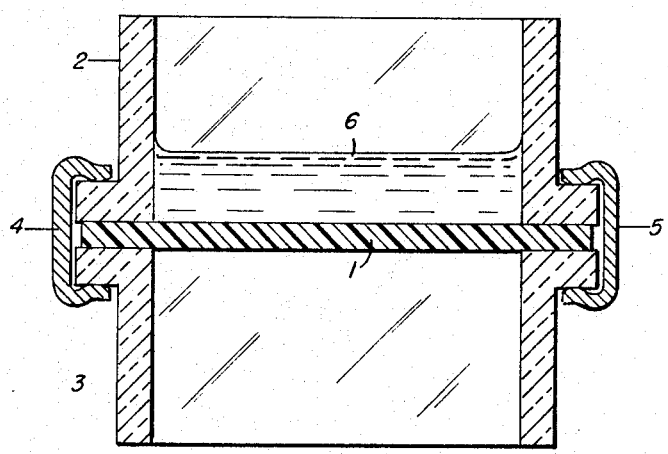
INVENTOR
ROBERT E. KESTING United States Patent Office 3,290,286
Patented Dec. 6, 1966

3,290,286
PARTIALLY HYDROLYZED CELLULOSIC REVERSE OSMOSIS MEMBRANES AND METHODS OF PREPARING THE SAME
Robert E. Kesting, Mount Baldy, Calif., assignor, by direct and mesne assignments, of one-half to Aerojet-General Corporation, Sacramento, Calif., and one-half to the United States of America as represented by the Secretary of the Interior
Filed Oct. 18, 1965, Ser. No. 497,565
6 Claims. (Cl. 260—230)

The invention herein described and claimed arose out of contract Number 14-01-0001-272 with the Office of Saline Water in the Department of the Interior, entered into pursuant to the Saline Water Act, Public Law 87-295.

This invention relates to desalination membranes for use in reverse osmosis processes for separating water from aqueous solutions. In particular, the invention sets forth a novel treatment of cellulosic ester membranes wherein the membranes are particularly hydrolyzed to convert ester groups to hydroxyl groups. Also, it is related to the operation of reverse osmosis cells for water purification using novel membranes made by the method of this invention whereby increased water permeation rates and adequate salt rejection is obtained.

The reverse osmosis process has attracted considerable interest in the field of sea water purification to produce inexpensive purified water from our most abundant source. The process is of general application in separating water from an aqueous solution with concurrent concentration of the feed stream. In the reverse osmosis process, a pressure in excess of the osmotic pressure of the feed solution is applied to a solution separated from a purified water reservoir by a semipermeable membrane. The direction of water flow observed in the classic osmosis experiment is reversed, and demineralization of the feed solution is accomplished.

In normal operation, the reverse osmosis desalination cell is maintained in continuous operation. The feed solution is introduced under pressure at the high pressure side of the cell and contacted with the membrane surface. The feed solution is circulated across the membrane surface so as to minimize the effects of boundary layer phenomena, and to decrease the solution concentration at the interface of the membrane. A portion of the concentrated feed solution is continuously withdrawn from the cell and may be discarded or utilized as a concentrate. Water passes through the selective osmotic membrane into the low pressure side of the cell and is withdrawn from the system, usually as the desired product. The thin membranes would normally rupture from the high pressure differential between the input and output sides of the cell were it not for the use of a porous backing between the membrane and the low-pressure side to provide a support for the thin film.

Certain membranes that are uncharged, such as cellulosic esters, are permeable to water while rejecting solutes. Although relatively high pressures of the order of 600 to 1,500 p.s.i. or higher are required for reverse osmosis of sea water, good salt rejection and reasonable flux rates have been economically obtained. The development of suitable membranes has progressed rapidly, most of the work being concentrated on the development of cellulose acetate membranes.

The preparation of successful reverse osmosis membranes has been disclosed by Loeb et al. in U.S. Patents 3,133,132 and 3,133,137, issued May 12, 1964. In these patents cellulosic ester membranes are cast from a casting solution comprising a film-forming cellulosic ester polymer, an organic solvent such as acetone, and an aqueous solution of a swelling salt such as $Mg(ClO_4)_2$. Other membrane casting solutions are disclosed by Watson et al. in co-pending application Serial No. 489,769, now U.S. Patent No. 3,250,701, filed September 15, 1965, and assigned to the same assignee as the instant application.

The exact nature of the transfer mechanism whereby water molecules are transported across the osmotic membrane while solute molecules remain in the feed solution is not completely known. It has long been known that certain polymers, in particular cellulose and cellulosics, have a strong affinity for water. In swollen gels of such materials, two types of water are present: that which is strongly bound to the membrane, and that which is merely superficially held in capillary spaces. The significance of the "bound" water concepts is that such water, by virtue of its interaction with the active sites (primarily OH groups in the cellulosic structure), is unable to solvate salts appreciably; consequently, salt transport as a dissolved phase is prevented. It is further assumed that "bound" water does retain ability to hydrogen-bond to free water molecules, and thus to permit transport of pure water through the membrane.

It has been determined that the reverse osmosis membranes prepared by the prior art workers possesses an "active" layer which is believed to be formed during the membrane casting process, and the desalination properties of the membranes are generally attributed to this "active" layer. The porous membrane substrate is not considered to have desalination properties, and both the pressure drop and concentration differential appears to be entirely delineated by the "active" layer.

The so-called "active" layer is formed during the casting and gelling steps of the membrane manufacture. During a water immersion of the film which has been cast on a plate, only one surface contacts the water bath. This is the surface at which the "active" layer is formed, and it has been demonstrated by the others that the reverse osmosis phenomenon is unidirectional in that the salt rejection by the film takes place only when the "active" layer is in contact with the high-pressure feed solution.

It has been discovered that the use of cellulose esters having a higher hydroxyl content, at least in the "active" layer, than those polymers used by prior art workers results in a greater water permeation or flux rate and also results in an acceptable salt content in the product water. The usual polymers employed in the preparation of cellulosic ester reverse osmosis membranes have about 2.3 to 2.4 acyl groups per glucose unit. By hydrolyzing at least the "active" surface of the membrane, the benefits of this discovery may be utilized.

Accordingly, it is an object of this invention to present a novel method for preparing cellulosic ester reverse osmosis films. In particular, it is an object of this invention to obtain novel membranes by partial hydrolysis of the membrane or a portion thereof. A further object of this invention is to present methods for operating reverse osmosis demineralization cells using novel cellulosic ester membranes.

These and other objects and improvements of the instant invention will be seen more clearly in the description following and in the appended drawings wherein:

The single figure is a vertical cross-sectional view of the preferred method for treating tthe membranes.

Since cellulose acetate is the commonly-used polymer for reverse osmosis, most of the discussion will be directed toward that embodiment of the concept. Cellulose acetate is manufactured by the well-known "acetate process" in which the cellulose is treated with acetic acid, acetic anhydride, and sulfuric acid as catalyst. The cellulose is fully acetylated (three acetate groups per glucose unit) and at the same time the sulfuric acid causes appreciable degradation of the cellulose polymer so that the product contains only 200–300 glucose units per polymer chain. Normally, at this point in the process, water is added to partially hydrolyze the cellulose acetate. The prior art workers have used polymers having an average of 2.3 to 2.4 acetate groups per glucose unit for manufacture of reverse osmosis membranes. This range corresponds to about 40 weight percent acetyl in the molecule.

In preparing the membranes, the casting solution is prepared by mixing the cellulosic ester material, swelling agent, and solvent and precooling the casting solution. A casting knife having runners of the desired thickness to produce a uniform film of finished thickness from about 1 to about 10 mils thick are cooled to the casting temperature and the casting solution is poured onto plates and distributed evenly by a casting knife. The solvent, usually acetone or dioxane or mixtures of these with other solvents or modifying agents, is evaporated from the film surface at a low temperature for a few minutes and the resulting membrane with the casting plate is immersed in cold water. The membranes are then heated in water at a temperature between about 77° and 90° for a period of time from about one-half to about thirty minutes.

At this point, according to one embodiment of the invention, the completed membrane is treated with an alkali solution to hydrolyze the "active" surface of the membrane. This may be accomplished by direct contact of the reagent with the "active" surface, or by contacting the porous substrate under the active layer with the reagent, or contacting both surfaces with the hydrolyzing agent. The first of these is preferred because of the relative ease of controlling the amount of hydrolysis by manipulating the reaction conditions.

*Example*

Referring to the drawing, a circular cellulose acetate membrane 1 prepared by the known prior art process is treated with caustic solution to hydrolyze the surface of the film. The untreated membranes had an acetyl content of 39.3 weight-percent prior to hydrolysis by the process of this invention. In the preferred hydrolysis method, the membrane is placed between two hollow glass cylinders 2 and 3 in a position transverse to the mating ends of the cylinders, which are axially aligned. In this position the membranes are clamped by suitable clamping means 4 and 5 to form a tight seal, exposing the membrane surfaces to the interior of the cylinders. The "active" surface of the membrane is faced upward and a small quantity of hydrolyzing solution 6 is poured into the upper cylinder onto the membrane surface to a depth of 1–2 cm. The solution is permitted to react with the membrane for a predetermined period of time and then is removed, for instance by rinsing, to terminate the reaction. In this example the reagent aqueous 0.4 M NaOH and the hydrolysis temperature was 23° C. In Table I the effect of hydrolysis on water permeation flow and salt rejection is shown for a standard reverse osmosis cell using a constant pressure differential and uniform conditions. A feed solution consisting of 3.5 weight percent NaCl was used for all tests.

TABLE I

| Hydrolysis Time (minutes) | Acetyl Content (weight percent in total membrane) | Water Flux Rate (gallons/ft.²/day) | | Product Concentration (p.p.m. NaCl) | |
|---|---|---|---|---|---|
| | | Initial Rate | After 2 hours | Initial Conc. | After 2 hours |
| 0 | 39.3 | 12.0 | 9.6 | 345 | 395 |
| 1 | 39.2 | 14.5 | 13.9 | 330 | 345 |
| 2.5 | 38.8 | 19.3 | 15.4 | 600 | 850 |
| 5 | 37.1 | 21.5 | ------ | 4,500 | ------ |

For the particular hydrolyzing reagent used, a range of 1 to 2.5 minutes gives a desirable increase in water permeation flux rate at a low product salt content. By changing the reaction conditions, the critical time range may be changed considerably. For instance by using a less concentrated solution of caustic or by using a weaker hydrolyzing agent, longer reaction times are needed to obtain equivalent conversion of acetate groups to hydroxyl groups in the cellulosic structure. Also, such variables as reaction temperature, stirring, and hydrolysis from the reverse side would affect the range. Therefore, it is not desired to limit the invention to the particular conditions recited in the example.

The desired result of the hydrolysis is the conversion of a portion of the ester groups to hydroxyl groups in the "active" layer. The exact thickness of this layer is not known; however, results of the experiments indicate that the outer 10% of the total membrane contributes substantially all of the demineralization characteristics to the film. It is stressed that only the *average* acetyl content of the membrane is measured in Table I. The surface acetyl content would be presumed to be smaller, since the hydrolysis would proceed from the outer molecules inward.

The desired *average* conversion of ester groups to hydroxyl groups is about 0.25 to about 1.25% of the total ester groups in the membrane. It is not known what fraction of the surface groups are hydrolyzed, since the exact thickness of the "active" layer is not known, nor is the penetration of the hydrolysis easily detected. It is presumed that substantially all of the "active" layer is hydrolyzed under the conditions of Table I and after 5 minutes. This is inferred from the increase in salt content in the product water.

Studies were undertaken to determine the effect of hydrolysis on flux rates for a deionized water feed with pressure as a parameter. The results of these tests are shown in Table II. The reaction conditions are those used in Table I.

TABLE II

| Hydrolysis time (minutes) | Acetyl content (weight percent in total membrane) | Water Flux Rate (gallons/ft.²/day) | | | | | |
|---|---|---|---|---|---|---|---|
| | | Feed Solution Pressure (p.s.i.g.) | | | | | |
| | | 300 | 500 | 750 | 1,000 | 1,250 | 1,500 |
| 0 | 39.3 | 4.0 | 8.4 | 12.0 | 16.0 | 20.0 | 24.0 |
| 1 | 39.2 | 5.6 | 10.0 | 14.0 | 19.2 | 20.2 | 25.6 |
| 2.5 | 38.8 | 8.8 | 16.0 | 20.8 | 27.6 | 30.4 | 38.0 |
| 5 | 37.1 | 10.0 | 16.8 | 24.0 | 32.0 | 33.6 | 44.0 |

These results establish that the water permeation is increased over the normal operating range for reverse osmosis desalination cells by partial hydrolysis of the cellulosic ester membrane. Although these data were obtained under non-desalination conditions, the mechanism for water transport has been previously shown by others to be the same for desalination. The above results agree with current theories of transport phenomena in reverse osmosis.

While cellulose acetate has been the most common membrane material used by the prior art workers and is the preferred embodiment of this invention, the acetyl group may be substituted by a suitable acyl radical, such as formyl, propionyl, butyryl, etc. Also, the concept is not limited by the particular casting procedure or membrane compositions disclosed, the only limitations being that the membranes comprise cellulosic ester polymer and be of the type suitable for use in reverse osmosis processes. The invention has been illustrated by specific examples but there is no intent to limit the invention to the specific details so disclosed, except insofar as set out in the following claims.

What is claimed is:

1. In the preparation of cellulosic ester reverse osmosis desalination membranes which have an active surface whereby high pressure aqueous solutions contacted with the active surface are separated into purified water and concentrated solution, the improvement which comprises partially hydrolyzing the active surface of the membranes with an alkali solution.

2. In the preparation of cellulosic ester reverse osmosis membranes, the improvement which comprises reacting the membrane with an alkali solution to partially convert ester groups to hydroxyl groups.

3. A reverse osmosis membrane prepared using the method of claim 2.

4. A process for treating cellulose acetate reverse osmosis membranes comprising contacting at least one membrane surface with alkali reagent to convert a portion of acetate groups in the membrane to hydroxyl groups.

5. The process of claim 4 wherein the alkali reagent is an aqueous caustic solution comprising about 0.4 M NaOH and the reagent is contacted with the membrane for about 1 minute to about 2.5 minutes.

6. The process of claim 4 wherein about 0.25 to about 1.25 percent of the acetyl groups are converted to hydroxyl groups.

References Cited by the Examiner

UNITED STATES PATENTS 2,705,689   4/1955   Hewson _____ 260—230 XR

OTHER REFERENCES

U.S. Office of Saline Water, "The Mechanism of Desalination by Reverse Osmosis, and its Relation to Membrane Structure." Research and Development Progress Report No. 143. By W. Banks and A. Sharples. Washington, D.C., U.S. Dept. of the Interior, June 1965, pp. 35–41.

U.S. Office of Saline Water, "The Mechanism of Desalination by Reverse Osmosis." Research and Development Progress Report No. 117. By Aerojet-General Corp., PB 166 395 (Jan. 5, 1965), pp. 18–20 and Table 9.

U.S. Office of Saline Water, "Reverse Osmosis for Water Desalination." Research and Development Progress Report No. 111. By General Atomic Div. of General Dynamics. PB 181 696 (June 17, 1964), page 120.

Ott. Emil, "Cellulose and Cellulose Derivative." (High Polymers, vol. 5, part II) New York, Interscience Publishers, c 1954, pp. 1022–1025.

References Cited by the Applicant

3,133,132   5/1964   Loeb et al.
3,133,137   5/1964   Loeb et al.
3,170,867   2/1965   Loeb et al.

OTHER REFERENCES

Manjikian et al.: "Improvement in Fabrication Techniques for Reverse Osmosis Desalination Membranes," paper presented at the First International Symposium on Water Desalination, Oct. 3–9, 1965, Washington, D.C.

ALEXANDER H. BRODMERKEL, *Primary Examiner.*

ROBERT F. WHITE, *Examiner.*

P. E. ANDERSON, *Assistant Examiner.*